United States Patent
Zheng et al.

(10) Patent No.: US 11,973,528 B2
(45) Date of Patent: Apr. 30, 2024

(54) PROTECTIVE CASE FOR PORTABLE ELECTRONIC DEVICE

(71) Applicant: Shenzhen Lingyi Innovation Technology Co., Ltd, Shenzhen (CN)

(72) Inventors: Yanghui Zheng, Shenzhen (CN); Sen Qiu, Shenzhen (CN); Yanghong Zheng, Shenzhen (CN); Jingyan Zheng, Shenzhen (CN); Qiushun Liu, Shenzhen (CN); Shaohua Chen, Shenzhen (CN)

(73) Assignee: SHENZHEN LINGYI INNOVATION TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/448,107

(22) Filed: Aug. 10, 2023

(65) Prior Publication Data
US 2024/0056117 A1 Feb. 15, 2024

(30) Foreign Application Priority Data
Aug. 11, 2022 (CN) .......................... 202222120844.2

(51) Int. Cl.
*H04B 1/3888* (2015.01)
*H04M 1/02* (2006.01)
*H04M 1/04* (2006.01)

(52) U.S. Cl.
CPC ............ *H04B 1/3888* (2013.01); *H04M 1/04* (2013.01)

(58) Field of Classification Search
None
See application file for complete search history.

(56) References Cited

U.S. PATENT DOCUMENTS

| | | | |
|---|---|---|---|
| 9,223,346 B2* | 12/2015 | Wilson | G06F 1/1626 |
| 9,432,074 B2* | 8/2016 | Fathollahi | B29C 45/14631 |
| 9,882,596 B2* | 1/2018 | Flores | G06F 1/1626 |
| 10,277,731 B2* | 4/2019 | Diebel | H04W 52/0296 |
| 2016/0142522 A1* | 5/2016 | Kim | A45C 11/00 |
| | | | 455/575.8 |
| 2018/0146084 A1* | 5/2018 | Diebel | H04B 1/3888 |
| 2020/0405027 A1* | 12/2020 | Chenier | A45C 11/00 |
| 2021/0376872 A1* | 12/2021 | Le | H04M 1/0264 |
| 2022/0029655 A1* | 1/2022 | Le | H04B 1/3888 |
| 2022/0182097 A1* | 6/2022 | Le | H04B 1/3888 |

FOREIGN PATENT DOCUMENTS

| | | | | |
|---|---|---|---|---|
| CN | 215453017 | * | 1/2022 | ............. H04M 1/18 |
| CN | 216565249 | * | 5/2022 | ............. H04M 1/18 |

* cited by examiner

*Primary Examiner* — Tuan A Tran
(74) *Attorney, Agent, or Firm* — Getech Law LLC; Jun Ye

(57) ABSTRACT

Embodiments of the present application disclose a protective case for a portable electronic device, which includes a rear shell and a camera decorative ring, the rear shell includes a back plate and a clamping element, the back plate is provided with an avoidance hole, and the inner wall surface of the avoidance hole is provided with a first retention groove, the outer peripheral surface of the camera decorative ring is provided with a limit surface, and a limit part is formed between the limit surface and the inner end surface of the camera decorative ring; the limit part is embedded in the first retention groove, and the inner end surface of the camera decorative ring is evenly aligned with or lower than the inner surface of the back plate.

18 Claims, 15 Drawing Sheets

PROTECTIVE CASE FOR PORTABLE ELECTRONIC DEVICE

The present disclosure claims priority of Chinese Patent Application No. 202222120844.2, filed on Aug. 11, 2022, the entire contents of which are hereby incorporated by reference in their entirety.

TECHNICAL FIELD

The present application relates to the technical field of protective accessory for portable electronic device, in particular to a protective case for portable electronic device.

BACKGROUND

Portable electronic devices such as mobile phones, tablet computers, etc. have a display screen on the front side, a camera on the rear side, and a rear camera module. When using the protective case to protect the portable electronic device, it is necessary to provide an avoidance hole corresponding to the rear camera module on the protective case. For the purpose of decoration and/or protection of the rear camera module, the protective case is generally in the form of an assembly, in addition to the case body with the avoidance hole, there is also a camera decorative ring installed on the edge of the avoidance hole. However, in an existing protective case, the camera decorative ring wraps the edges of the avoidance hole inside and outside. In this way, the camera decorative ring protrudes from the inner side of the case body, when the case body is assembled with a portable electronic device, the portion of the case body close to the edge of the avoidance hole will have non-predetermined deformation. On the one hand, the deformation transmitted to the side wall of the case body can affect the gripping with the portable electronic device, thereby increasing the risk of detaching of the protective case and the portable electronic device. On the other hand, this deformation will also affect the fitting with other accessories, such as brackets or charging equipment, thereby reducing the stability of the protective case when being supported.

SUMMARY OF THE DISCLOSURE

The main purpose of this application is to propose a protective case for portable electronic device, which aims to solve the problem that the protective case of existing portable electronic device is easily deformed at the edge of the avoidance hole of the rear camera module, which in turn greatly increase the risk that the protective case might detach from the portable electronic device, and also bring about the technical issue that the protective case is not easy to be steadily supported.

In order to achieve the above purpose, the protective case of the portable electronic device proposed by the present application includes a rear shell and a camera decorative ring, the rear shell includes a back plate and an clamping element extending forward from the edge of the back plate, the back plate is provided with an avoidance hole, the inner wall surface of the avoidance hole is provided with a first retention groove, and a first limit part is formed between the outer surface of the back plate and the first retention groove;

The outer peripheral surface of the camera decorative ring is provided with a second retention groove, and the second retention groove has a first limit surface and a second limit surface opposite the first limit surface in the axial direction, and a second limit part is formed between the second limit surface and an inner end surface of the camera decorative ring;

The first limit part is embedded in the second retention groove, the first limit surface is in contact with the outer surface of the back plate, and the first limit surface is in contact with the inner wall surface of the first retention groove. The second limit part is embedded in the first fixing groove, and the inner end surface of the camera decorative ring is evenly aligned with or lower than the inner surface of the back plate.

Preferably, both the first retention groove and the second retention groove are ring-shaped, and the first retention groove is formed at the junction between the inner wall surface of the avoidance hole and the inner surface of the back plate.

Preferably, in any cross section passing through the central axis of the avoidance hole, the outer edge of the first limit surface is closer to the central axis of the avoidance hole than the outer edge of the second limit surface. In some implementations, the avoidance hole can be a round hole, a rectangular hole, a square hole, an oval hole, or a hole of any other suitable shape.

Preferably, the portion of the outer peripheral surface of the camera decorative ring exposed to the outside of the back plate is provided with a chamfer at a portion adjacent to the first limit surface, and the chamfer is tapered from inside to outside along the central axis of the avoidance hole.

Preferably, an annular first avoidance step is provided at the junction between the inner peripheral surface of the camera decorative ring and the inner end surface of the camera decorative ring, the first avoidance step has a third limit surface and a first avoidance surface connected to the third limit surface, the third limit surface extends along a direction close to the central axis of the avoidance hole, the first avoidance surface is tapered from inside to outside along the central axis of the avoidance hole.

Preferably, a second avoidance step is provided on the outer peripheral surface of the camera decorative ring at a portion exposed to the outside of the back plate, and the second avoidance step is at least provided on one side of the camera decorative ring close to the center of the back plate.

Preferably, the second escape step is ring shaped.

Preferably, the second avoidance step includes a second avoidance surface and a third avoidance surface, and the second avoidance surface extends along the outer surface of the back plate, and the third avoidance surface is tapered from inside to outside along the central axis of the avoidance hole.

Preferably, a third limit part is formed between the second avoidance surface and the first limit surface, and a chamfer is formed at the junction between the outer peripheral surfaces of the second avoidance surface and the third limit part, and the chamfer is tapered from inside to outside along the central axis of the avoidance hole.

Preferably, the clamping element is thin-walled, and the end of the clamping element away from the back plate bends inwardly to form a clamping surface; wherein multiple clamping elements are provided, and the multiple clamping elements are arranged at intervals along the outer edge of the back plate.

For the protective case of the portable electronic device of the present disclosure, with the first retention groove on the inner wall surface of the avoidance hole, and the second limit part that can be embedded in the first retention groove is arranged on the camera decorative ring, the inner end surface of the camera decorative ring is evenly aligned with or lower than the inner surface of the back plate, thereby avoiding friction between the camera decorative ring and the portable electronic device arranged in the protective case, preventing the corners of the protective case from lifting, avoiding damages to the portable electronic device caused by local stress concentration in the camera module of the portable electronic device and the camera decorative ring of the protective case when the protective case containing the portable electronic device is dropped or collides with other objects, further avoiding deformation at the edge portion of the avoidance hole, so that the protective case can be firmly clamped with the portable electronic device placed therein, and the protective case can be substantially fitted with other supporting accessories, thereby ensuring stability when being supported. In addition, the first limit part formed by the edge of the avoidance hole can be embedded in the second retention groove, and the inner and outer sides of the second limit part are respectively connected with the first limit surface and the second limit surface, thereby a two-way limit is placed on the first limit part, so that a stable fitting is formed between the camera decorative ring and the rear shell, further reducing the risk of the camera decorative ring falling off.

BRIEF DESCRIPTION OF THE DRAWINGS

In order to more clearly illustrate the technical solutions in the embodiments of the present application, the drawings used in the description of the embodiments will be briefly introduced below. Obviously, the drawings in the following description are only some embodiments of the present application. For those skilled in the art, other drawings can also be obtained based on these drawings without creative effort.

DETAILED DESCRIPTION

The following will clearly and completely describe the technical solutions in the embodiments of the application with reference to the drawings in the embodiments of the application. Apparently, the described embodiments are only some of the embodiments of the application, not all embodiments. Based on the embodiments in this application, all other embodiments obtained by persons of ordinary skill in the art without creative efforts fall within the protection scope of this application.

Figure 1:
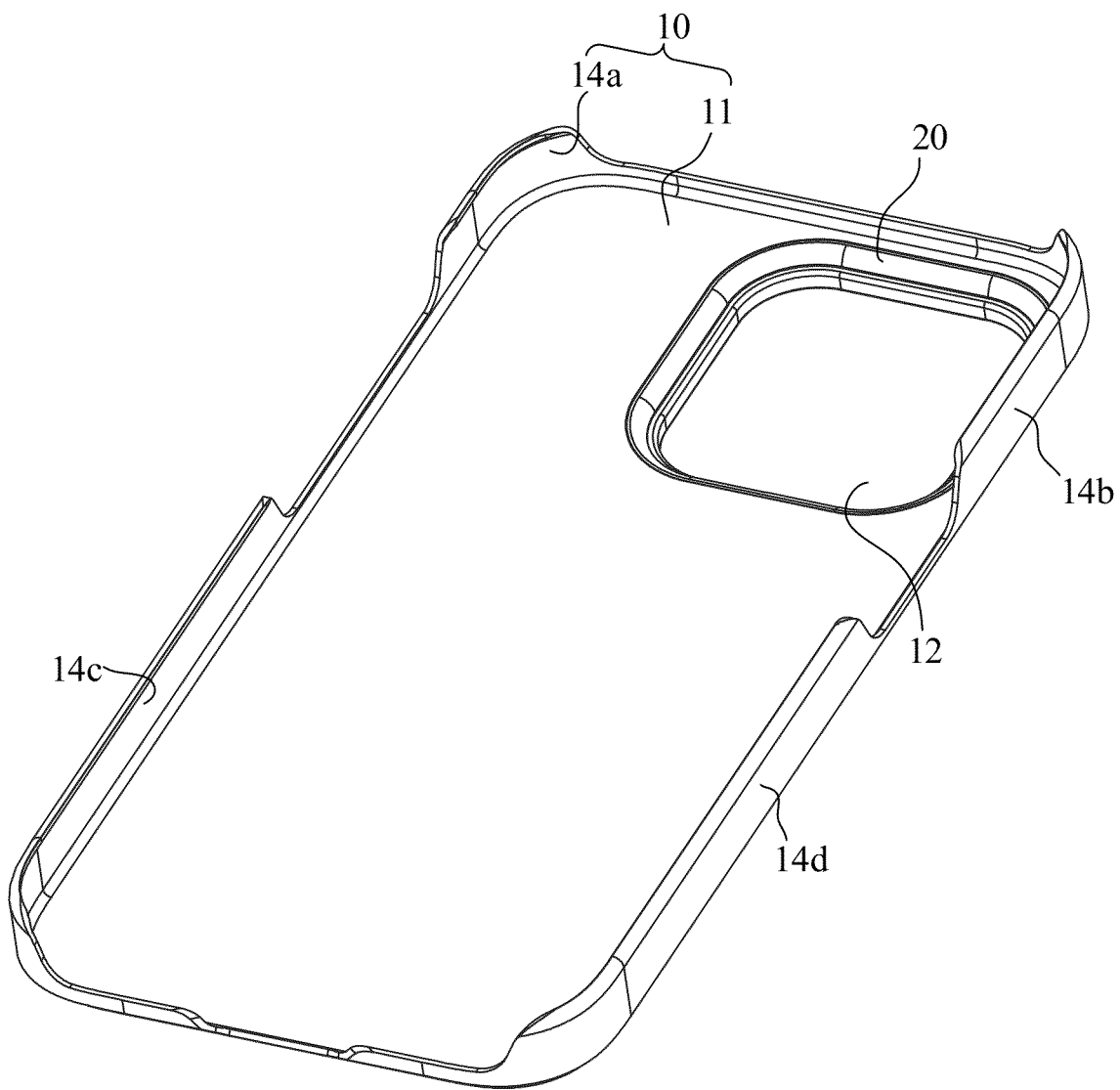
FIG. 1 is a three-dimensional structural schematic diagram of a protective case of a portable electronic device of the present invention.
Figure 2:
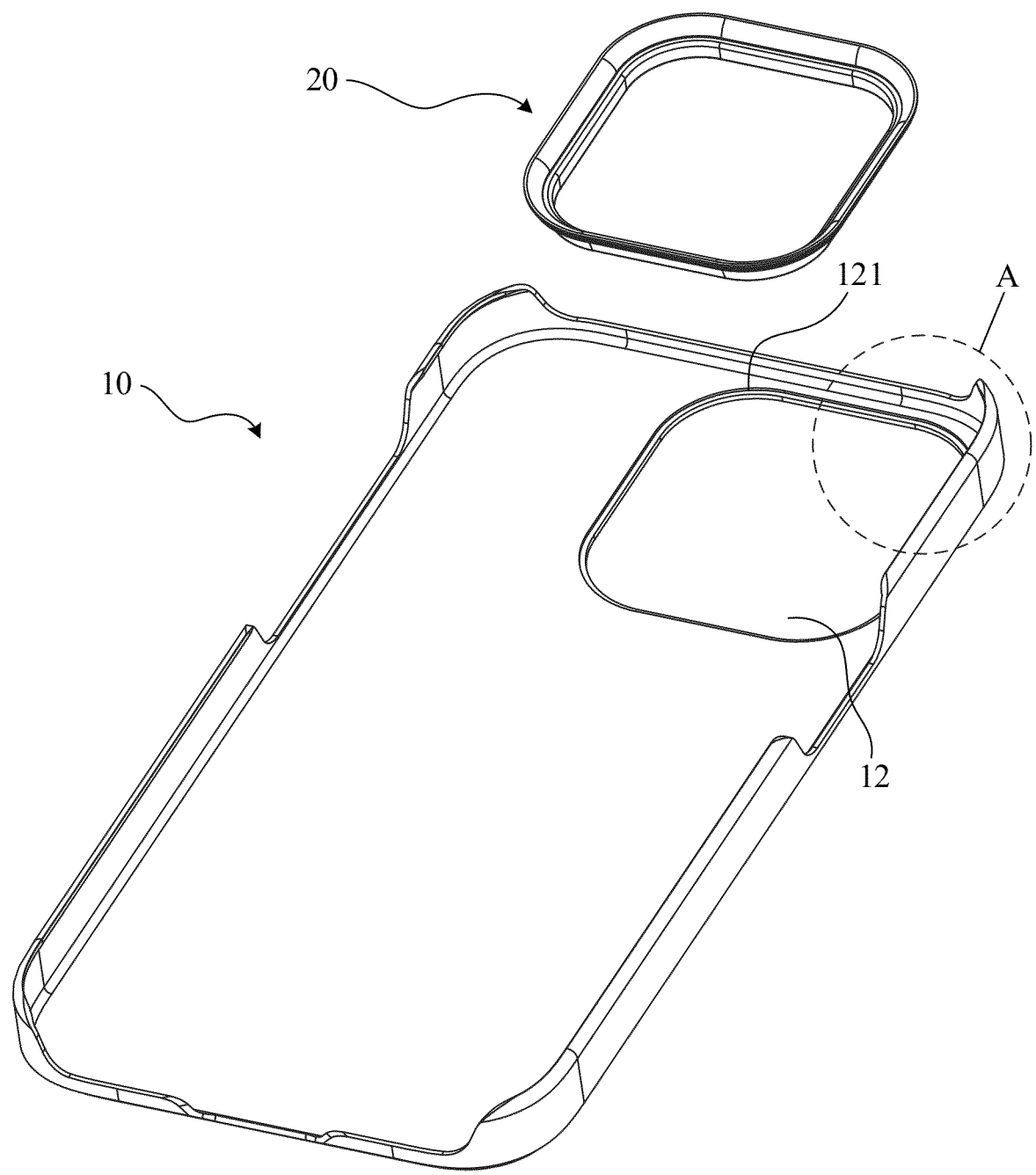
FIG. 2 is the exploded view diagram of the protective case of the portable electronic device in FIG. 1.
Figure 3:
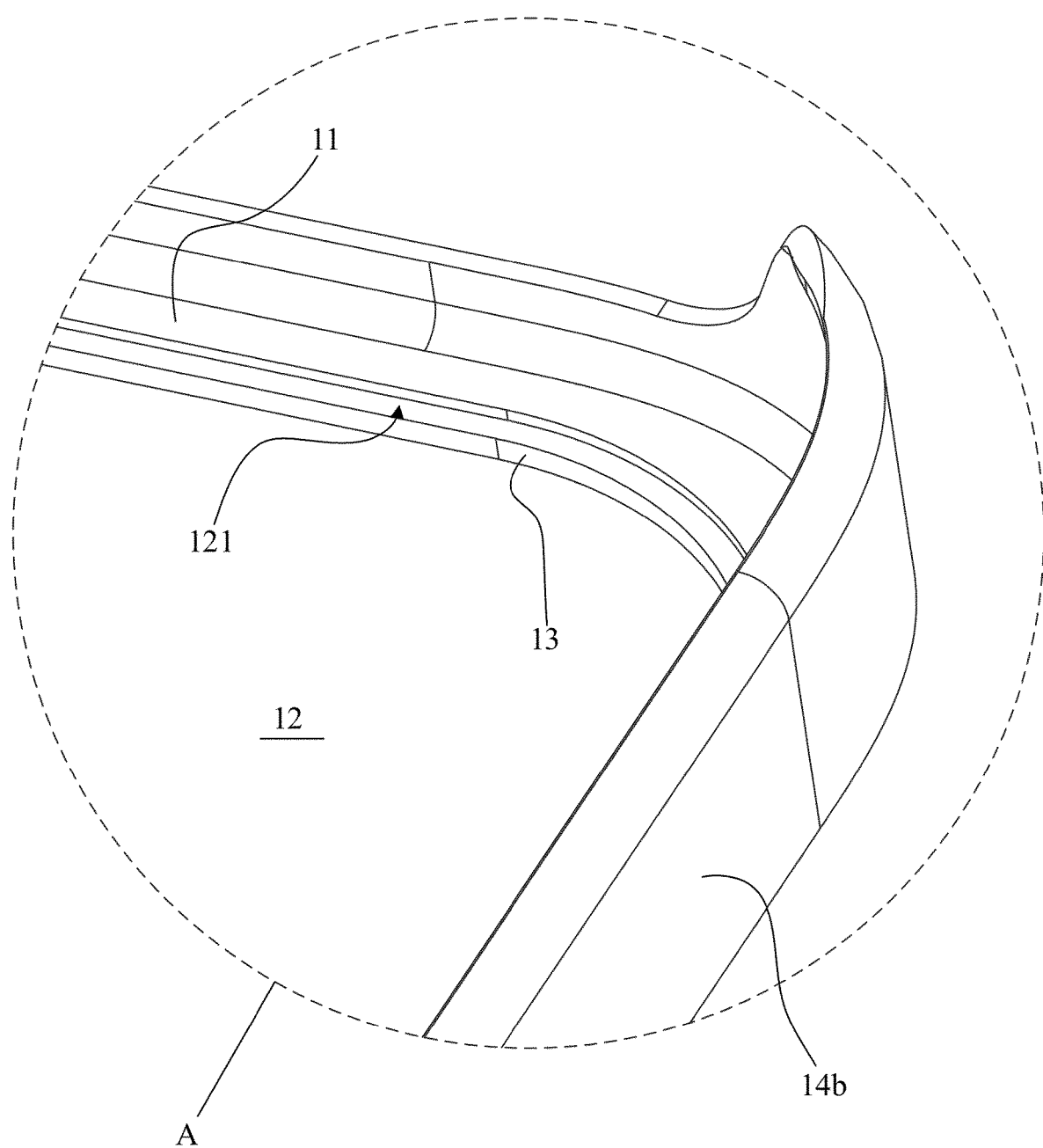
FIG. 3 is a schematic diagram of a partially enlarged structure at A in FIG. 2.
Figure 6:
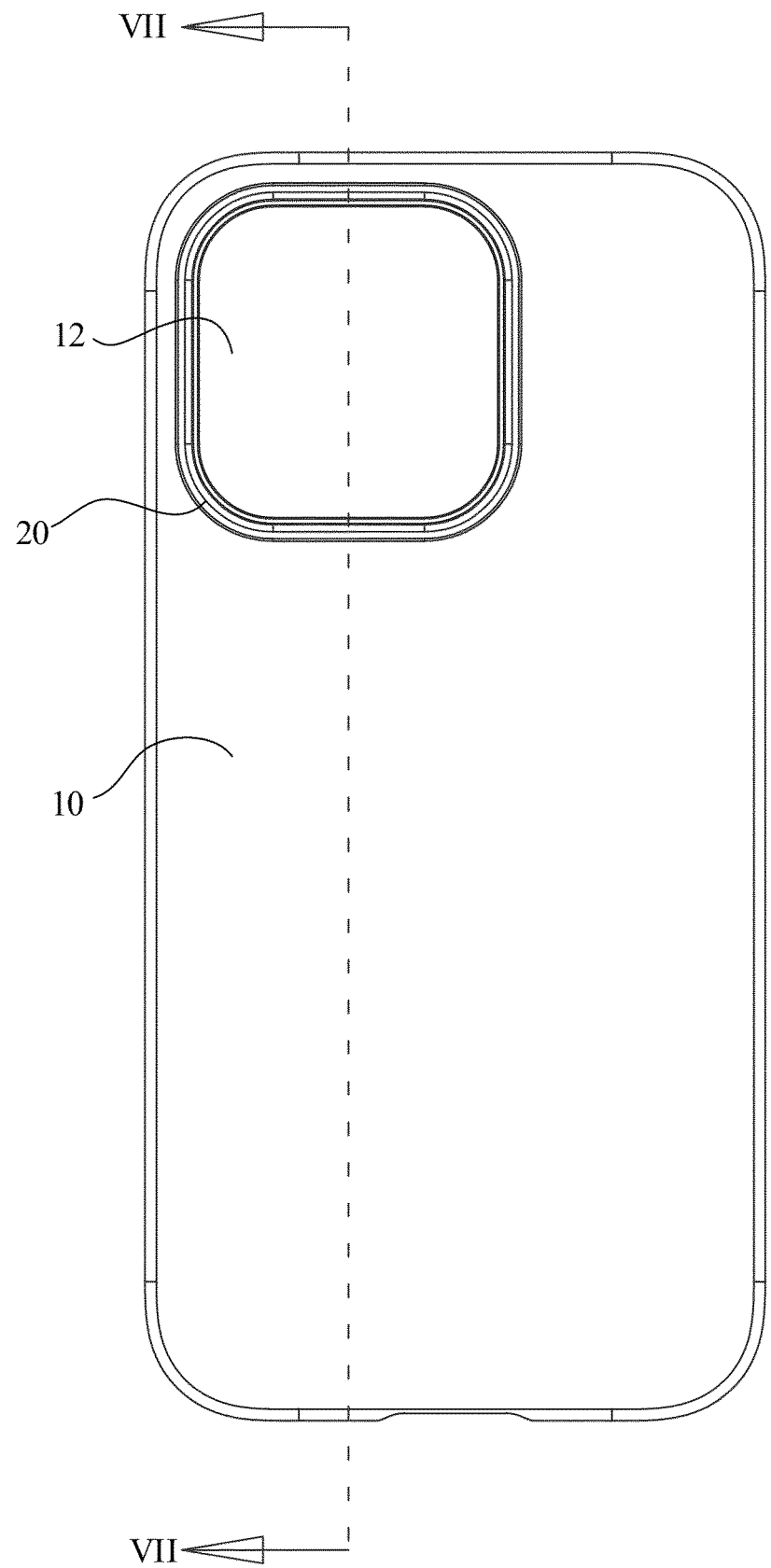
FIG. 6 is a rear view structural schematic diagram of the protective case of the portable electronic device in FIG. 1.
Figure 7:
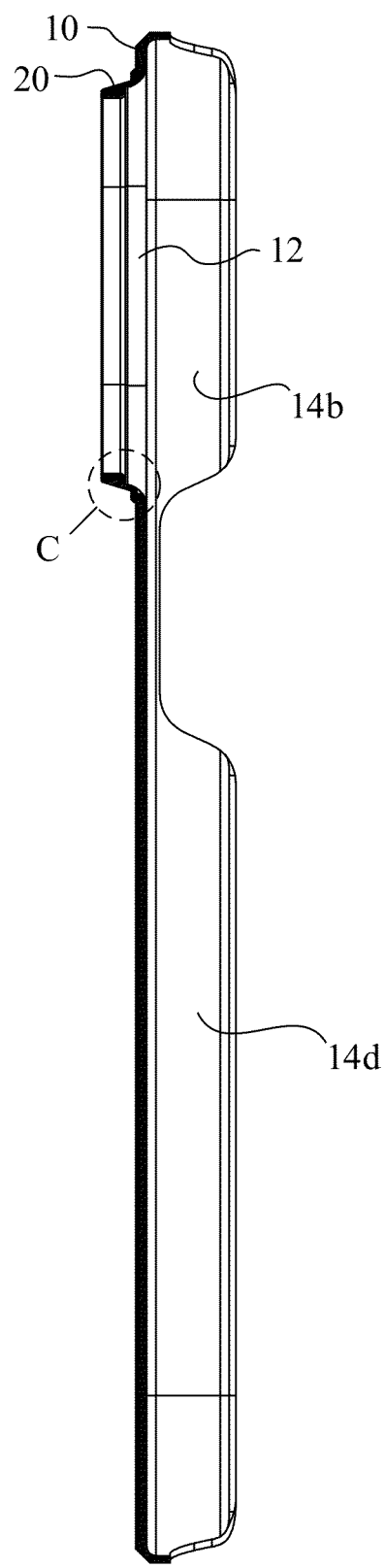
FIG. 7 is a cross-sectional structure schematic diagram along line VII-VII in FIG. 6.
Figure 8:
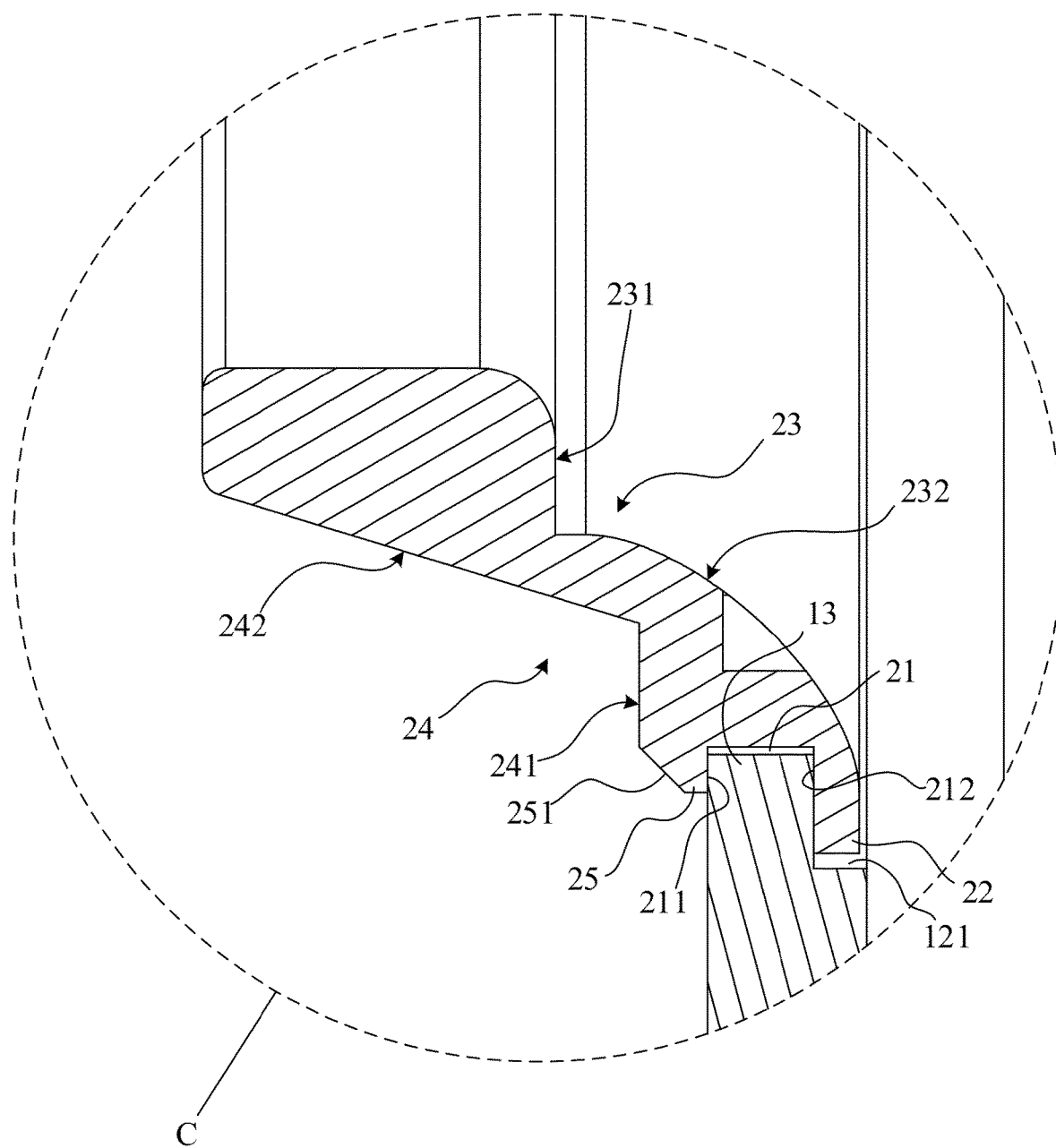
FIG. 8 is a schematic diagram of a partially enlarged structure at C in FIG. 7.

Referring to FIG. 1 to FIG. 3, FIG. 6 to FIG. 8, in one embodiment, the protective case 100 of the portable electronic device that the present application proposes comprises a rear shell 10 and a camera decorative ring 20, the rear shell 10 comprises back plate 11 and clamping elements 14a-14d extending forward from the edge of the back plate 1, the back plate 11 is provided with an avoidance hole 12, the inner wall of the avoidance hole 12 is provided with a first retention groove 121, and a first limit part 13 is formed between the outer surface of the back plate 11 and the retention grooves 121;

The outer peripheral surface of the camera decorative ring 20 is provided with a second retention groove 21, the second retention groove 21 has a first limit surface 211 and a second limit surface 212 opposite the first limit surface 211 in the axial direction, a second limit portion 22 is formed between the second limit surface 212 and the inner end surface of the camera decorative ring 20;

The first limit part 13 is embedded in the second retention groove 21, the first limit surface 211 is in contact with the outer surface of the back plate 11, and the first limit surface 211 is in contact with the inner wall surface of the first retention groove 121. The second limit portion 22 is embedded in the first retention groove 121, and the inner end surface of the camera decorative ring 20 is evenly aligned with or lower than the inner surface of the back plate 11.

Figure 11:
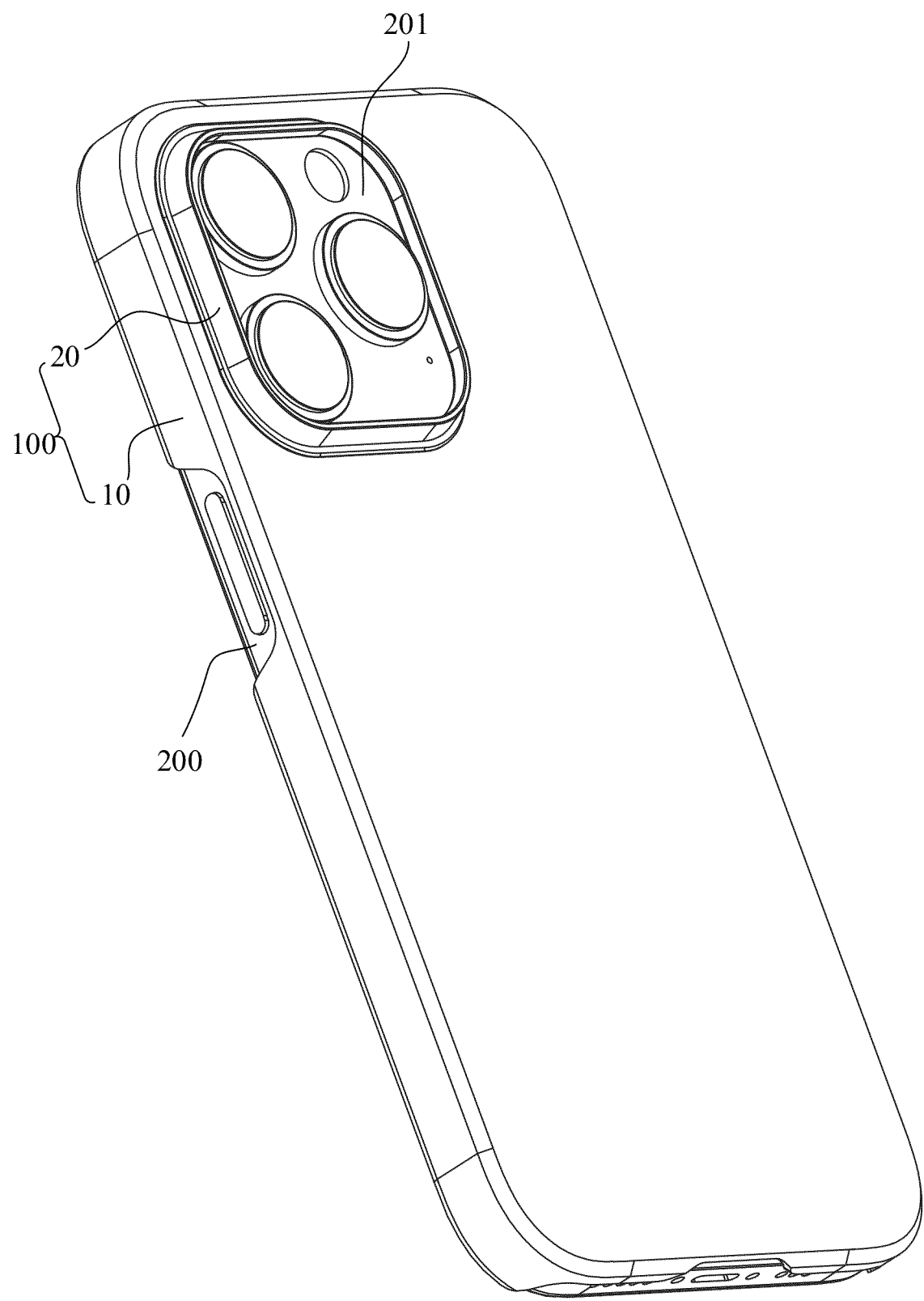
FIG. 11 is a schematic diagram of the back side of the structure in FIG. 9.
Figure 12:
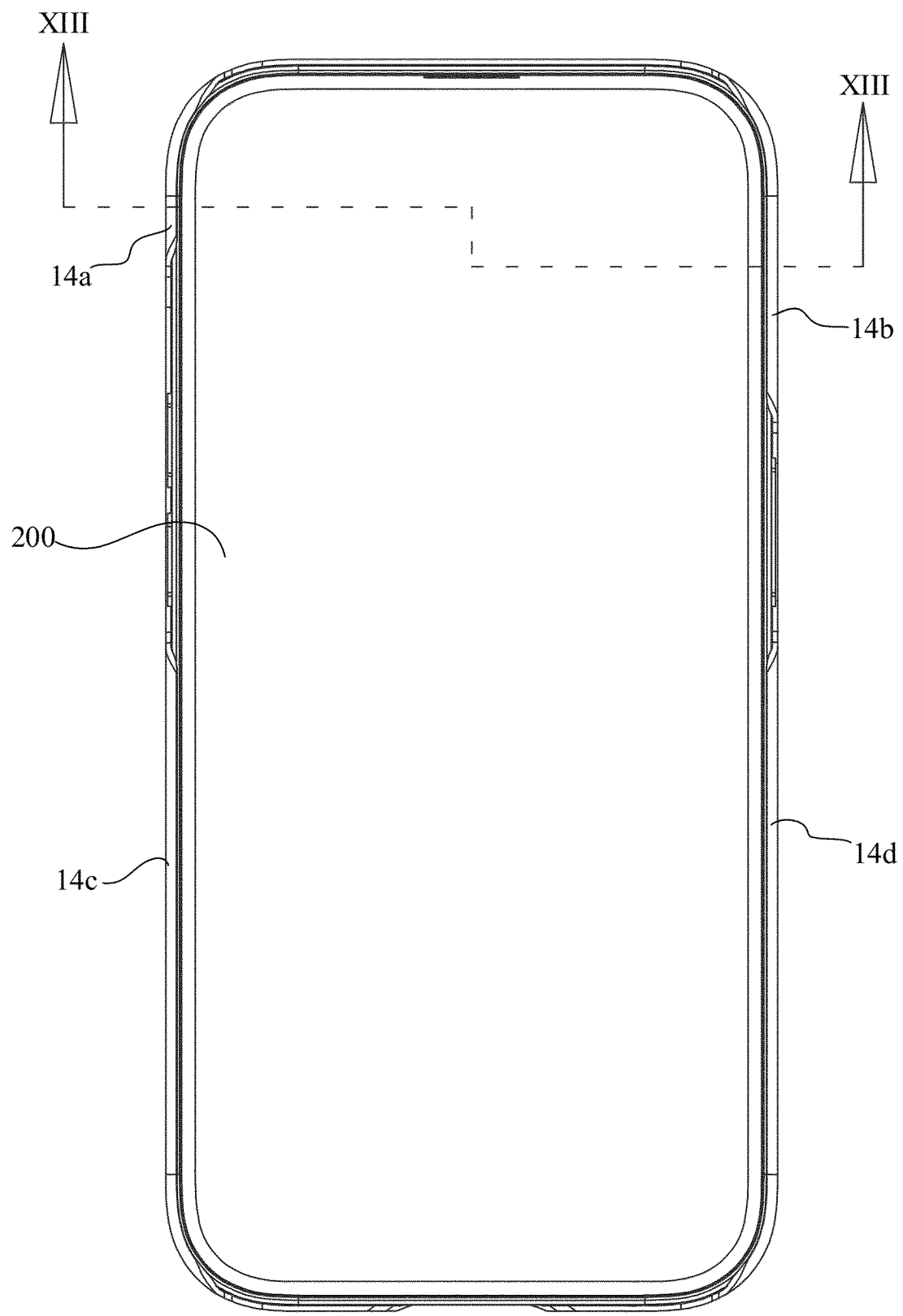
FIG. 12 is a front view structural schematic diagram of the structure in FIG. 9.
Figure 13:
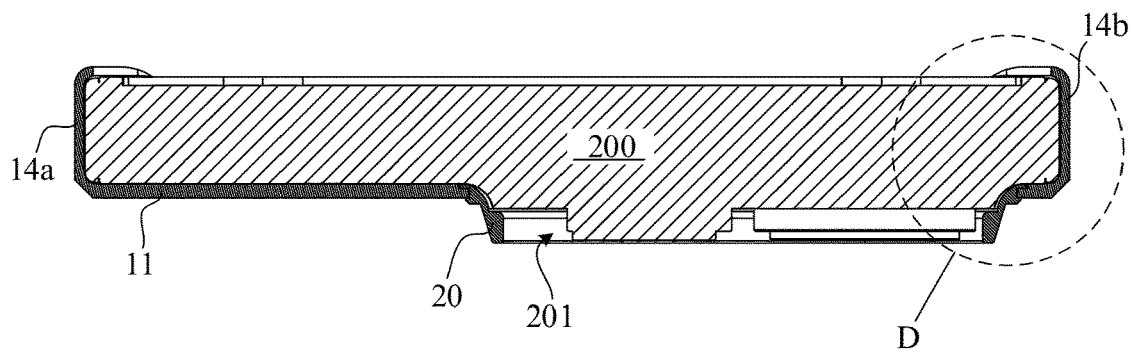
FIG. 13 is a cross-sectional structure schematic diagram along line XIII-XIII in FIG. 12.
Figure 14:
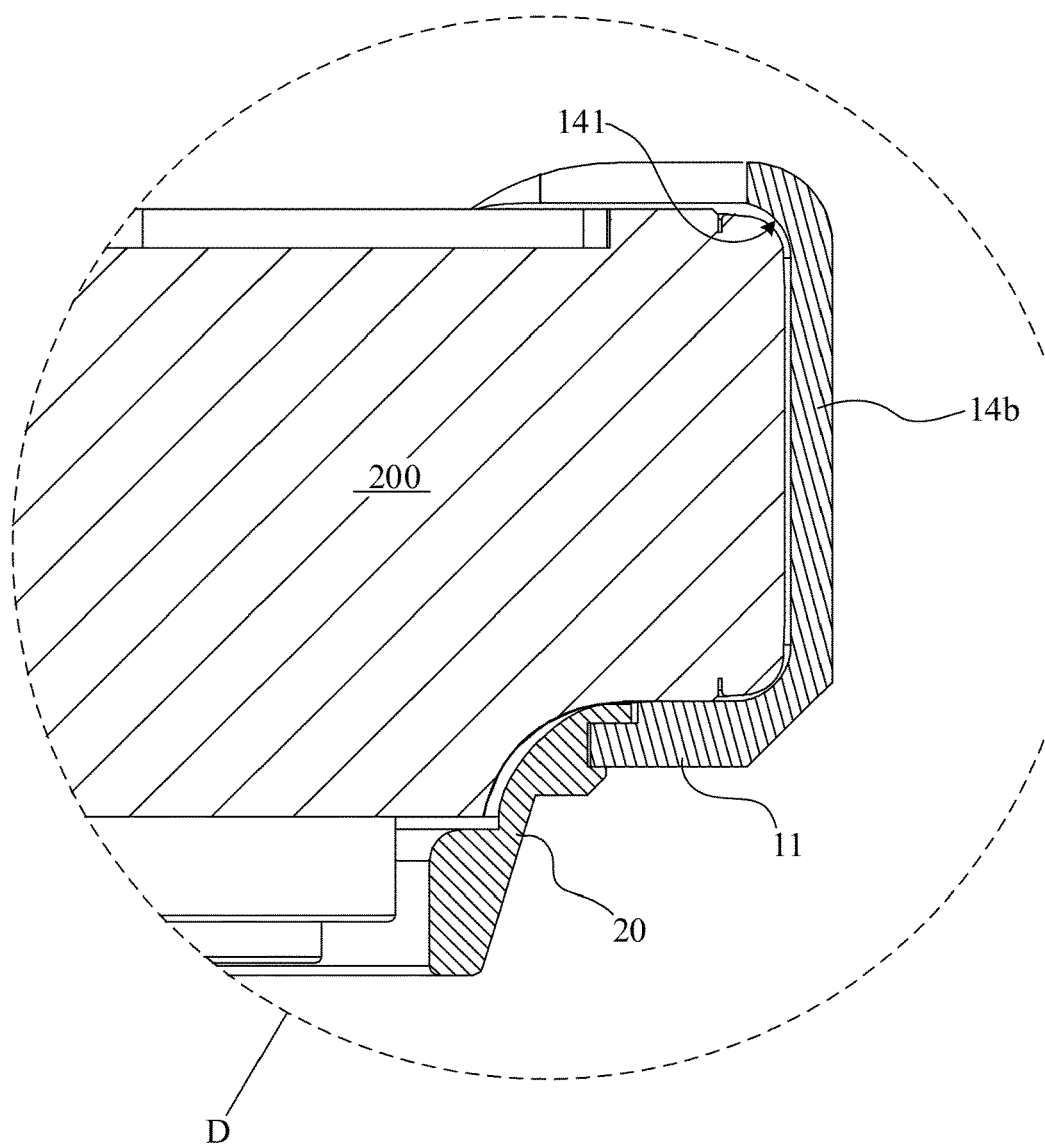
FIG. 14 is a schematic diagram of a partially enlarged structure at D in FIG. 13.

In this embodiment, the portable electronic device 200 may be a mobile phone, a tablet computer or other electronic devices that require case protection and have a camera module. In addition to the rear shell 10 and the camera decorative ring 20, the protective case 100 of the portable electronic device may also include a front cover in some other embodiments. Please refer to FIGS. 11 to 14 together. After assembly with the portable electronic device 200 is completed, the back plate 11 of the rear shell 10 is attached to the rear side of the portable electronic device 200 or is set opposite to the rear side of the portable electronic device 200. The rear camera module 201 of the electronic device 200 is exposed from the avoidance hole 12, and the camera decoration ring 20 protrudes from the outer surface of the back plate 11 and is located on the periphery of the rear camera module 201. The first retention groove 121 and the second retention groove 21 may be ring shaped, or may be discontinuously arranged along the edge of the avoidance hole 12, as long as the rear shell 10 and the camera decorative ring 20 are fixedly connected. Due to different emphasis on functions, the rear shell 10 and the camera decorative ring 20 are usually made of different materials.

For example, the rear shell 10 can be made of Kevlar, while the camera decorative ring 20 can be made of silicone or metal.

The protective case 100 of the portable electronic device of the present application is provided with the first retention groove 121 on the inner wall surface of the avoidance hole 12, and the second limit part 22 that can be embedded in the first retention groove 121 is provided on the camera decorative ring 20. In this way, the inner end surface of the camera decorative ring 20 is evenly aligned with the inner surface of the back plate 11 or lower than the inner surface of the back plate 11, thereby avoiding friction between the camera decorative ring 20 and the portable electronic device located in the protective case 100, further avoiding deformation at the edge portion of the avoidance hole, so that the protective case 100 can be firmly clamped with the portable electronic device 200 placed therein, and the protective case 100 can be fully fitted with other supporting accessories 300, thereby ensuring stability when being support. In addition, the first limit portion 13 formed by the edge of the escape hole 12 can be embedded in the second retention groove 21, and the inner and outer sides of the second limit portion 22 are respectively connected to the first limit surface 211 and the second limit surface 212, thereby forming a two-way limit with the first limit part 13, so that a stable fitting is formed between the camera decorative ring 20 and the rear shell 10, further reducing the risk of the camera decorative ring 20 falling off.

Further, in order to increase the stability and convenience of assembly, both the first retention groove 121 and the second retention groove 21 are annular, and the first retention groove 121 is formed on junction between the inner wall surface of the avoidance hole 12 and the inner surface of the back plate 11. It can be understood that the annular shape of the first fixing groove 121 and the second fixing groove 21 can form a larger contact area, thereby increasing the stability of assembly.

Further, in any cross section of the central axis of the avoidance hole 12, the outer edge of the first limit surface 211 is closer to the central axis of the avoiding hole 12 than the outer edge of the second limit surface 212. In this way, when the camera decoration ring 20 is pushed into the avoidance hole 12 from inside to outside, the amount of bending deformation of the outer edge of the first limit surface 211 is relatively small, so that the assembly resistance is small.

Further, the portion of the outer peripheral surface of the camera decorative ring 20 exposed outside the back plate 11 is provided with a chamfer 251 adjacent to the first limit surface 211, and the chamfer 251 is tapered from the inside to the outside along the central axis of the avoidance hole 12. In this way, when the camera decorative ring 20 is pushed into the escape hole 12 from the inside to the outside, the inner edge of the first limit portion 13 abuts against the chamfer 251, and the chamfer 251 will generate a reaction force outward along the direction perpendicular to the central axis of the avoidance hole 12, thereby stretching the avoidance hole 12, so that the assembly resistance of the camera decorative ring 20 is smaller, and the corresponding assembly operation is smoother.

Figure 9:
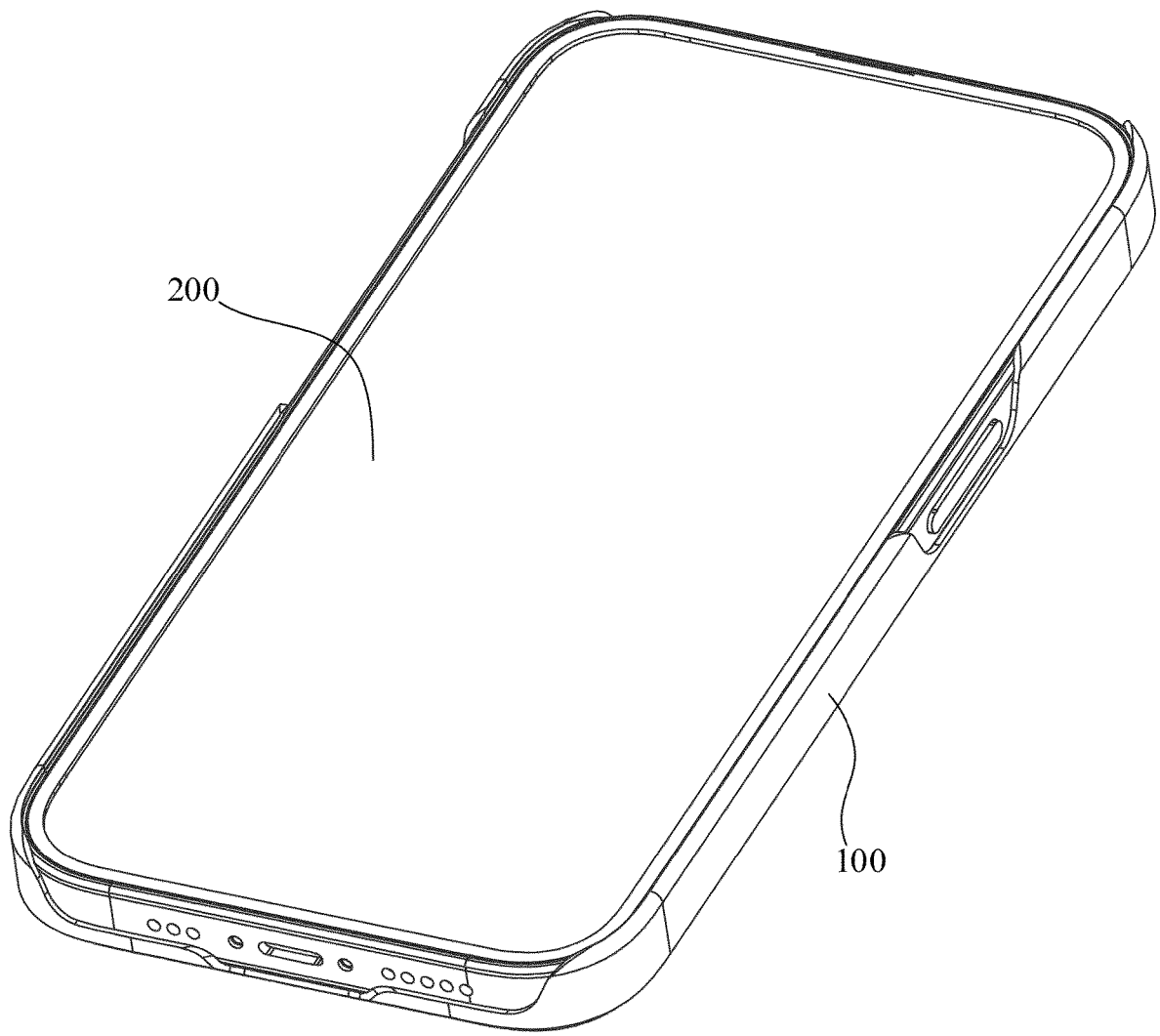
FIG. 9 is a three-dimensional schematic diagram of the matching between the protective case of a portable electronic device in FIG. 1 and a mobile phone.
Figure 10:
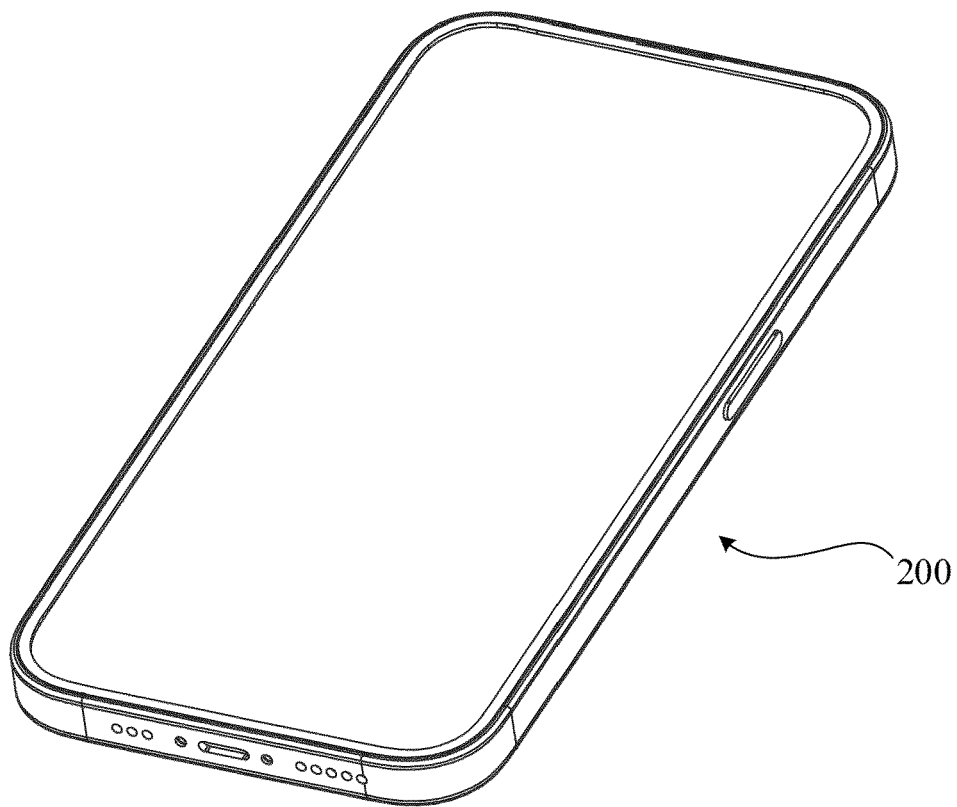
FIG. 10 is a schematic diagram of the exploded structure of the structure in FIG. 9.
Figure 10:
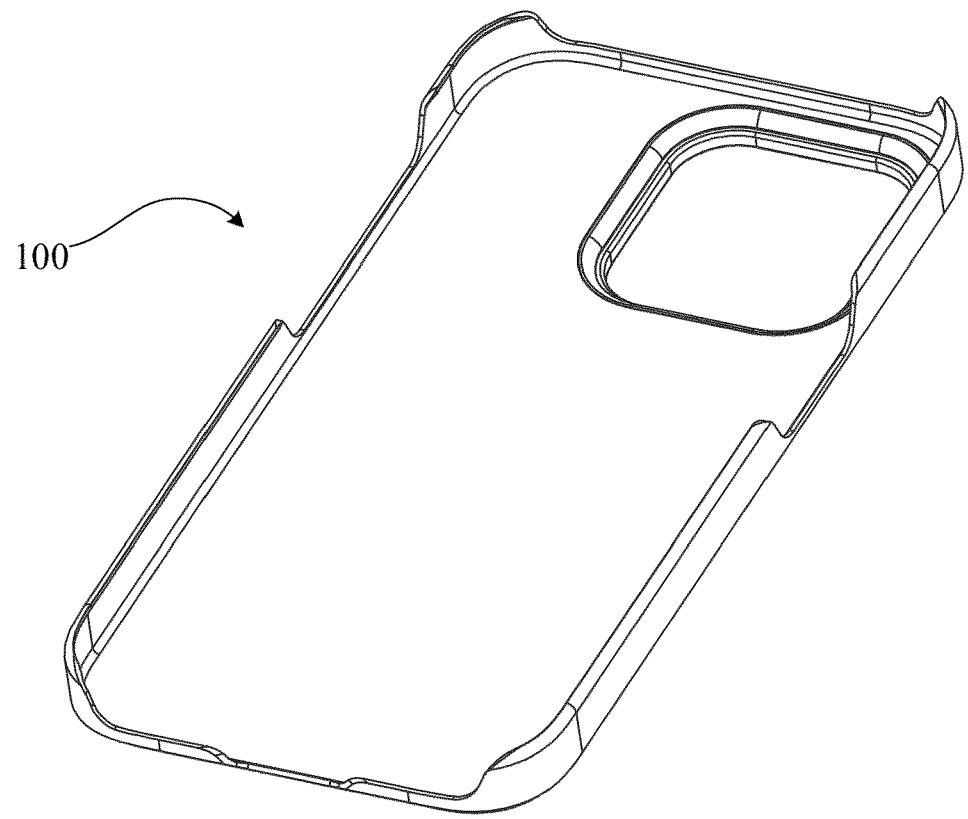

Further, with reference to FIG. 6 to FIG. 14, in one embodiment, the connection between the inner peripheral surface of the camera decoration ring 20 and the inner end surface of the camera decoration ring 20 is provided with an annular first avoidance step 23, the first avoidance step 23 has a third limit surface 231 and a first avoidance surface 232 connected with the third limit surface 231, the third limit surface 231 extends in a direction close to the central axis of the avoidance hole 12, and the first avoidance surface 232 is tapered from inside to outside along the central axis of the avoidance hole 12.

In this embodiment, since the rear camera module has a boss protruding from the rear side of the portable electronic device 200, each lens protrudes from the top surface of the boss. By setting the first avoidance step 23, the camera decorative ring 20 can be set close enough to the rear camera module, and the third limit surface 231 abuts against the top surface of the boss, so that a more firm wrapping structure can be formed, so as to better protect the rear camera module. In specific embodiments, the first avoidance surface 232 is generally an inclined surface or a convex curved surface.

Figure 4:
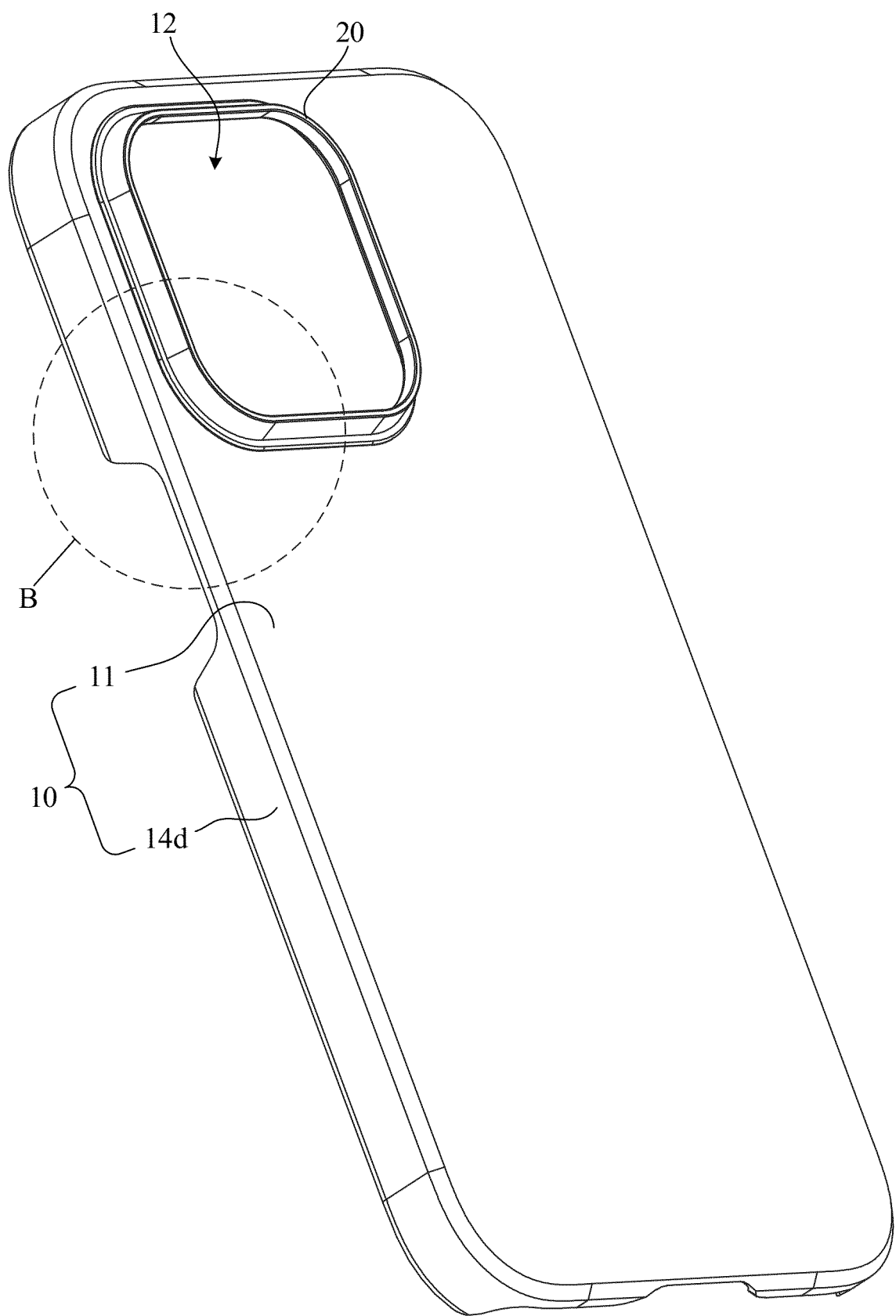
FIG. 4 is a three-dimensional structural schematic diagram of the back side of the portable electronic device protective case in FIG. 1.
Figure 5:
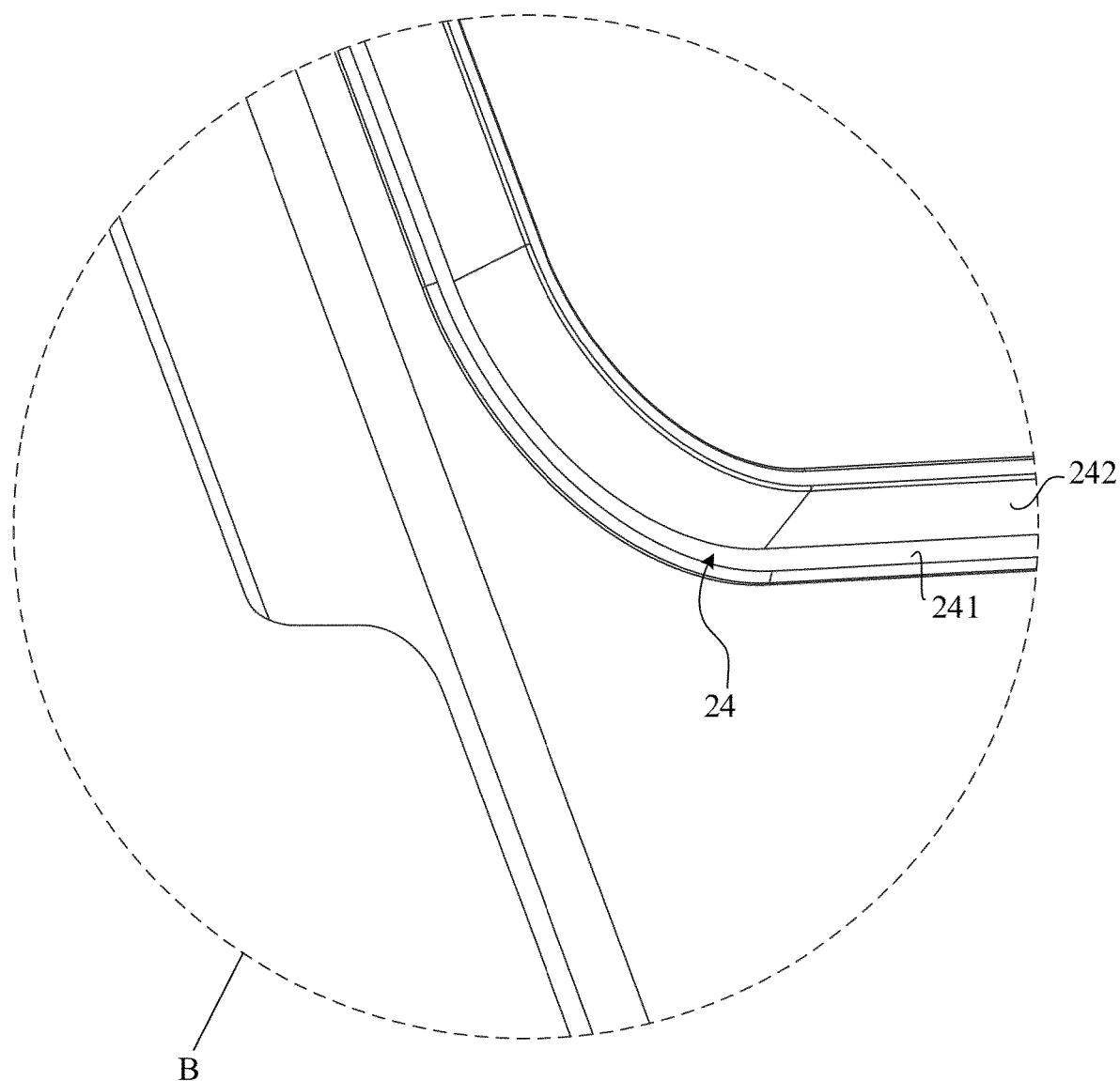
FIG. 5 is a schematic diagram of a partially enlarged structure at B in FIG. 4.
Figure 15:
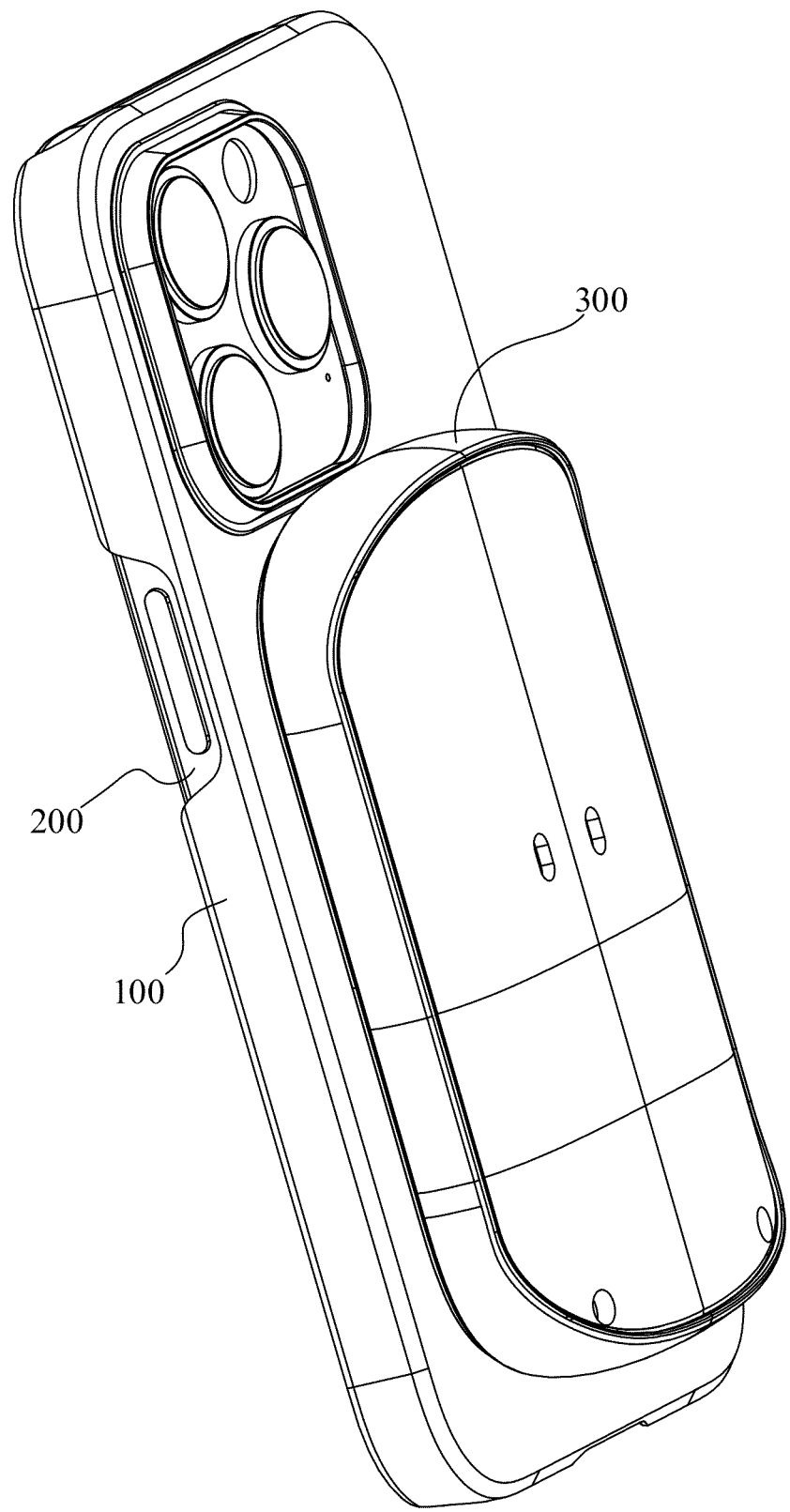
FIG. 15 is a three-dimensional schematic diagram of the matching between the protective case of the portable electronic device in FIG. 1 and a magnetic charging device.
Figure 16:
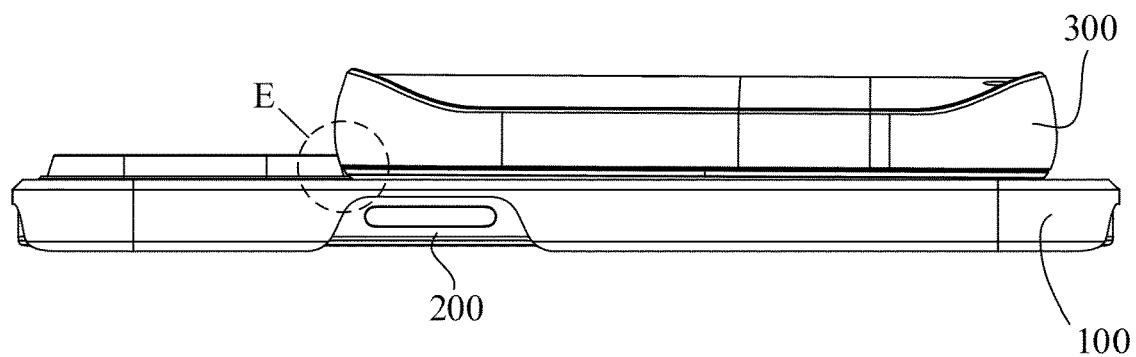
FIG. 16 is a side view structural schematic diagram of the structure in FIG. 15.
Figure 17:
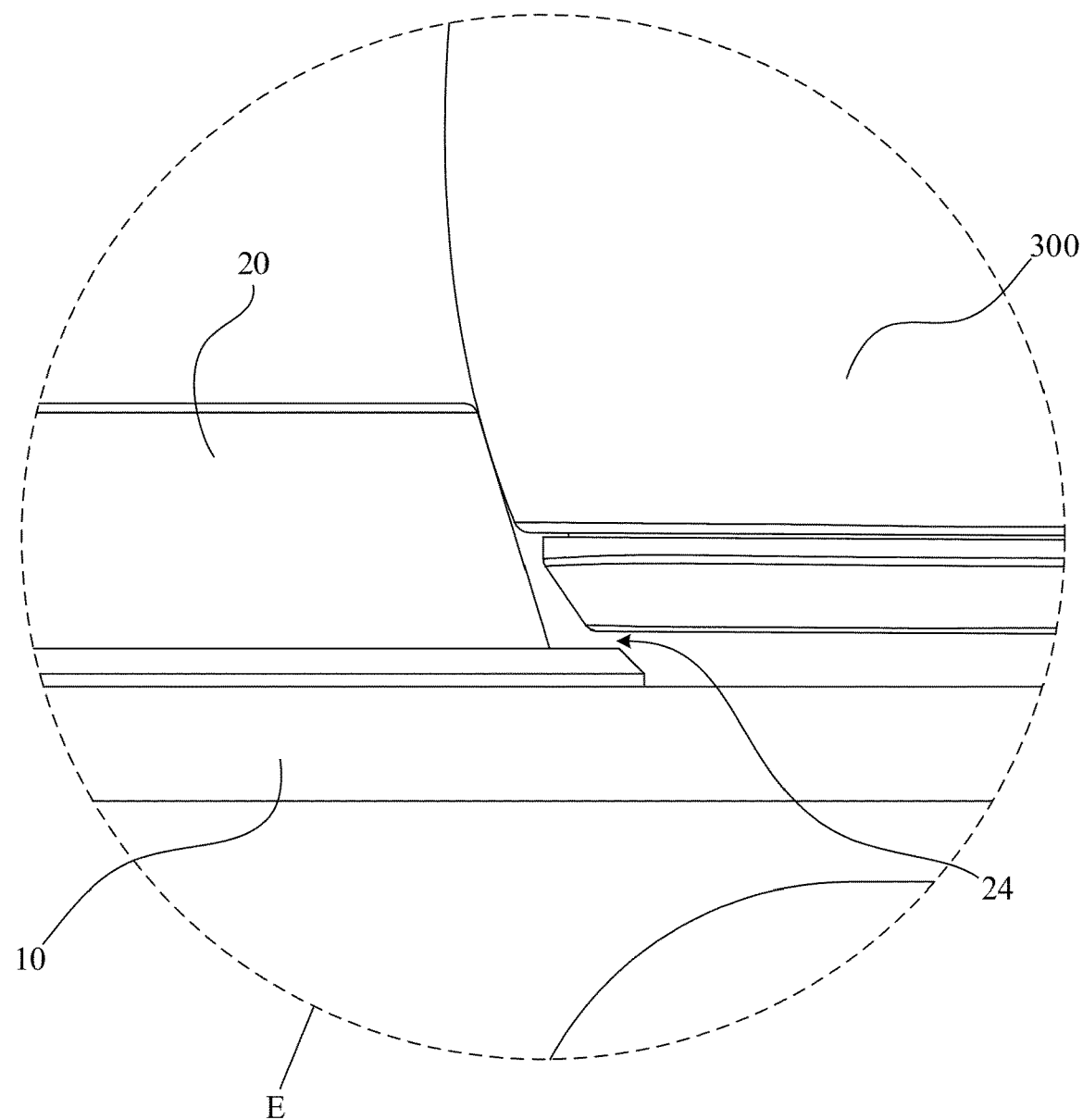
FIG. 17 is a schematic diagram of a partially enlarged structure at E in FIG. 16.

Further, referring to FIG. 4 to FIG. 8, and FIG. 15 to FIG. 17, in one embodiment, a second avoidance step 24 is provided on the outer peripheral surface of the camera decoration ring 20 exposed to the outside of the back plate 11, and the second avoidance step 24 is at least provided on one side of the camera decorative ring 20 close to the center of the back plate 11.

In this embodiment, a supporting accessory 300, such as a magnetic charging device or a magnetic bracket, is usually provided with a supporting surface that is used for attaching to the rear side of the protective case 100. By providing the second avoidance step 24, the supporting accessory 300 can fully extend toward the direction close to the camera decorative ring 20 without interference. In order to avoid stress concentration and improve aesthetic appearance, preferably, the second avoidance step 24 is in the shape of a ring.

Further, in order to make the exposed end of the camera decorative ring 20 passing through the avoidance hole 12 from the inside to the outside more quickly, the second avoidance step 24 includes a second avoidance surface 241 and a third avoidance surface 242. The second avoidance surface 241 extends along the outer surface of the back plate 11, and the third avoidance surface 242 is tapered from inside to outside along the central axis of the avoidance hole 12. In a specific embodiment, the third escape surface 242 is preferably an inclined surface or a convex curved surface.

Further, a third limit part 25 is formed between the second avoidance surface 241 and the first limit surface 211, and a chamfer 251 is formed at the junction between the outer peripheral surfaces of the second avoiding surface 241 and the third limit part 25, the chamfer 251 is tapered from inside to outside along the central axis of the avoidance hole 12.

In this embodiment, when the camera decorative ring 20 is pushed into the avoidance hole 12 from inside to outside, the inner edge of the first limit portion 13 abuts against the chamfer 251 on the third limit part 25, and the chamfer 251 can generate a reaction force to stretch the avoidance hole 12, so that the assembly resistance of the camera avoidance ring 20 is smaller, and the corresponding assembly operation is smoother.

Further, referring to FIG. 1 to FIG. 4, FIG. 6, FIG. 7, and FIG. 9 to FIG. 14, in one embodiment, the clamping elements 14a-14d are thin-walled, and the parts of the clamping elements 14a-14d away from the back plate 11 is bent inwardly to form a clamping surface 141; there are a plurality of clamping elements 14a-14d, and the plurality of clamping elements 14a-14d are arranged at intervals along the outer edge of the backboard 11.

In this embodiment, the clamping elements 14a-14d are thin-walled so that the lateral dimension of the overall structure can be reduced while laterally limiting the position of the portable electronic device 200. There are multiple clamping elements 14a-14d, but they are arranged at intervals along the outer edge of the back plate 11, so as to provide avoidance gaps for components such as power switch part and volume adjustment parts on the side of the portable electronic device 200.

Finally, it should be noted that: the above embodiments are only used to illustrate the technical solutions of the present application, but not to limit them; although the present application has been described in detail with reference to the foregoing embodiments, those of ordinary skill in the art should understand that: modifications can still be made to the technical solutions described in the foregoing embodiments, or equivalent replacements can be made to some of the technical features, and these modifications or replacements do not drive the essence of the corresponding technical solutions away from the spirit and scope of the technical solutions of the various embodiments of the present application.

What is claimed is:

1. A protective case for a portable electronic device, comprising:
   a rear shell and a camera decorative ring, wherein,
   the rear shell includes a back plate and a clamping element extending forward from the edge of the back plate, the back plate is provided with an avoidance hole, and the inner wall surface of the avoidance hole is provided with a first retention groove;
   the outer peripheral surface of the camera decorative ring is provided with a limit surface, and a limit part is formed between the limit surface and the inner end surface of the camera decorative ring;
   the limit part is embedded in the first retention groove, and the inner end surface of the camera decorative ring is evenly aligned with or lower than the inner surface of the back plate wherein the inner peripheral surface of the camera decorative ring has a first avoidance surface, the first avoidance surface is tapered from inside to outside along the central axis of the avoidance hole in the back plate.

2. The protective case of the portable electronic device according to claim 1, wherein the limit surface provided on the outer peripheral surface of the camera decorative ring is a second limit surface, and the limit part formed between the limit surface and the inner end surface of the camera decorative ring is a second limit part; wherein a first limit part is formed between the outer surface of the back plate and the first retention groove, and the outer peripheral surface of the camera decorative ring is provided with a second retention groove, wherein the second retention groove has a first limit surface and a second limit surface opposite the first limit surface in the axial direction, the first limit part is embedded in the second retention groove, the first limit surface is in contact with the outer surface of the back plate, and the first limit surface is in contact with the inner wall surface of the first retention groove.

3. The protective case of a portable electronic device according to claim 2, wherein the first retention groove and the second retention groove are both ring-shaped, and the first retention groove is formed at the junction of the inner wall surface of the avoidance hole and the inner surface of the back plate.

4. The protective case of a portable electronic device according to claim 3, wherein in any cross section passing through the central axis of the avoidance hole, the outer edge of the first limit surface is closer to the central axis of the avoidance hole than the outer edge of the second limit surface.

5. The protective case of a portable electronic device according to claim 4, wherein the portion of the outer peripheral surface of the camera decorative ring exposed outside of the back plate is provided with a chamfer at a portion adjacent to the first limit surface, and the chamfer is tapered from inside to outside along the central axis of the avoidance hole.

6. The protective case for portable electronic equipment according to claim 1, wherein a second avoidance step is provided on the outer peripheral surface of the camera decorative ring at a portion exposed to the outside of the back plate, and the second avoidance step is at least provided on one side of the camera decorative ring close to the center of the back plate.

7. The protective case for portable electronic equipment according to claim 6, wherein the second avoidance step is ring shaped.

8. The protective case for portable electronic equipment according to claim 7, wherein the second avoidance step includes a second avoidance surface and a third avoidance surface, the second avoidance surface extends along the outer surface of the back plate, and the third avoidance surface is tapered from inside to outside along the central axis of the avoidance hole.

9. The protective case of a portable electronic device according to claim 8, wherein a third limit part is formed between the second avoidance surface and the first limit surface, and a chamfer is formed at the junction between outer peripheral surfaces of the second avoidance surface and the third limit part, and the chamfer is tapered from inside to outside along the central axis of the avoidance hole.

10. The protective case of a portable electronic device according to claim 1, wherein the clamping element is thin-walled, and the end of the clamping element away from the back plate bends inwardly to form a clamping surface; wherein multiple clamping elements are provided, and the multiple clamping elements are arranged at intervals along the outer edge of the back plate.

11. A protective case for a portable electronic device, comprising:
    a rear shell and a camera decorative ring, wherein,
    the rear shell includes a back plate and a clamping element extending forward from an edge of the back plate, the back plate is provided with an avoidance hole, a first limit part is formed between the outer surface of the back plate and the inner wall surface of the avoidance hole;
    the outer peripheral surface of the camera decorative ring is provided with a retention groove, the first limit part is embedded in the retention groove, and the inner end surface of the camera decorative ring is lower than the inner surface of the back plate, wherein the inner peripheral surface of the camera decorative ring has a first avoidance surface, the first avoidance surface is tapered from inside to outside along the central axis of the avoidance hole in the back plate.

12. The protective case of a portable electronic device according to claim 11, wherein the retention groove has a first limit surface and a second limit surface opposite the first limit surface in the axial direction, and the first limit surface is in contact with the outer surface of the back plate.

13. The protective case of a portable electronic device according to claim 12, wherein in any cross section passing through the central axis of the avoidance hole, the outer edge of the first limit surface is closer to the central axis of the avoidance hole than the outer edge of the second limit surface.

14. The protective case of a portable electronic device according to claim 13, wherein the portion of the outer peripheral surface of the camera decorative ring exposed outside of the back plate is provided with a chamfer at a portion adjacent to the first limit surface, and the chamfer is tapered from inside to outside along the central axis of the avoidance hole.

15. The protective case of a portable electronic device according to claim 11, wherein the retention groove is ring-shaped.

16. The protective case for portable electronic equipment according to claim 11, wherein a second avoidance step is provided on the outer peripheral surface of the camera decorative ring at a portion exposed to the outside of the back plate, and the second avoidance step is at least provided on one side of the camera decorative ring close to the center of the back plate.

17. The protective case for portable electronic equipment according to claim 16, wherein the second avoidance step is ring shaped.

18. The protective case for portable electronic equipment according to claim 17, wherein the second avoidance step includes a second avoidance surface and a third avoidance surface, and the second avoidance surface extends along the outer surface of the back plate, and the third avoidance surface is tapered from inside to outside along the central axis of the avoidance hole.

\* \* \* \* \*